United States Patent [19]

Eidler et al.

[11] Patent Number: 5,860,003
[45] Date of Patent: Jan. 12, 1999

[54] I/O CONTROLLER SOFTWARE WITH EACH I/O COMMAND HAVING A PLURALITY OF NETS, EACH WITH A GROUP OF THREADS

[75] Inventors: Christopher W. Eidler, Morgan Hill; Kumar Gajjar, San Jose; David H. Jaffe, Belmont, all of Calif.

[73] Assignee: MTI Technology, Inc., Anaheim, Calif.

[21] Appl. No.: 808,723

[22] Filed: Feb. 28, 1997

[51] Int. Cl.⁶ .................................................... G06F 3/00
[52] U.S. Cl. ..................... 395/676; 395/707; 395/825; 395/181; 711/100
[58] Field of Search ................................. 395/707, 306, 395/677, 678, 181, 182, 828; 711/114, 100

[56] References Cited

U.S. PATENT DOCUMENTS

| | | | |
|---|---|---|---|
| 5,140,592 | 8/1992 | Idleman et al. | 395/182.03 |
| 5,195,100 | 3/1993 | Katz et al. | 395/182.2 |
| 5,274,645 | 12/1993 | Idleman et al. | 395/182.04 |
| 5,345,588 | 9/1994 | Greenwood et al. | 395/677 |
| 5,574,851 | 11/1996 | Rathunde | 395/182.05 |
| 5,598,549 | 1/1997 | Rathunde | 711/114 |
| 5,613,114 | 3/1997 | Anderson et al. | 395/678 |
| 5,740,384 | 4/1998 | Asthana et al. | 395/306 |

Primary Examiner—Christopher B. Shin
Attorney, Agent, or Firm—Townsend and Townsend and Crew LLP

[57] ABSTRACT

A modular software control system for an I/O subsystem. A central group of software modules are made to be hardware-independent, with interface modules translating from the host hardware configuration and the I/O subsystem hardware configuration. I/O commands are accomplished using a series of specialized threads, with each thread performing a particular function. An appropriate group of threads are assembled for each I/O command, the group being a "net".

37 Claims, 14 Drawing Sheets

| Field | Description |
|---|---|
| TCB | Thread Control Block Structure |
| NetNode<br>{<br>   prtNCB<br>   nodeID<br>   predecessorCount<br>   successorCount<br>   ptrPredecessor<br>   ptrSuccessor<br>} | Net Node Structure<br><br>Pointer to Net Control Block<br>Node ID<br>Predecessor Count<br>Successor Count<br>Pointer to Predecessor(s)<br>Pointer to Successor(s) |
| Type | Thread Type |
| IOParameters<br>{<br>   Opcode<br>   PhysicalDeviceAddress<br>   LogicalBlockAddress<br>   PhysicalBlockAddress<br>   ByteCount<br>} | IO Parameter Structure<br><br>Opcode<br>Physical Device Address<br>Logical Block Address<br>Physical Block Address<br>Transfer Size |
| VSID | Virtual Store ID |
| LockRole | Span/Recovery Lock Role (allocate/deallocate) |
| BufferRole | Buffer Role (allocate/use/deallocate) |
| PtrBufferTable | Pointer to Buffer Table in the Net |
| StandaloneBuffer | Pre-allocated Buffers passed to the Thread (if any) |
| PtrErt | Pointer to Error Recovery Table |
| RecoveryNetCtx | Context area for Recovery Net (if spawned) |

Fig. 10

I/O CONTROLLER SOFTWARE WITH EACH I/O COMMAND HAVING A PLURALITY OF NETS, EACH WITH A GROUP OF THREADS

BACKGROUND OF THE INVENTION

The present invention relates to I/O controller software for I/O subsystems, and in particular for RAID subsystems.

Typically, memory subsystems, such as RAID (Redundant Array of Independent Disks) subsystems have been implemented using primarily hardware and firmware. This approach is driven by the need to provide high performance, high bandwidth storing and retrieving of data.

Some vendors attempted to create a "software RAID" solution with software which would run on general purpose computers and transform those computers into RAID servers. This approach suffered from lack of high performance and bandwidth for the storing of data.

An example of a RAID system is set forth in U.S. Pat. No. 5,140,592, the disclosure of which is incorporated herein by reference.

SUMMARY OF THE INVENTION

The present invention provides a modular software control system for an I/O subsystem. A central group of software modules are made to be hardware-independent, with interface modules translating to and from the host hardware configuration and the I/O subsystem hardware configuration. I/O commands are executed using a series of specialized threads, with each thread performing a particular function. An appropriate group of threads are assembled for each I/O command, the group being a "net".

High performance and bandwidth is accomplished by having the threads independent and able to operate concurrently. In a RAID system, for example, if each net operates on a particular span of data in the disk drives. Other nets can operate on other spans in the same disk drives concurrently. Even for a particular span of data, only particular threads within a net that actually use the disk drives need to lock up that span for the duration of the thread operation.

The span lock capability of this invention improves throughput over prior art systems where an entire physical disk drive needs to be locked to a particular I/O command. In addition, within a span, an error recovery routine may be run and only need to lock up a particular portion of that span. Thus, the thread discovering the error, or other threads, could use other portions of the span concurrently with the error recovery, further improving the bandwidth.

The present invention provides a core command engine which is generic and can be used with any I/O system hardware. This is accomplished using a generic command module which communicates with a media module to obtain a particular net for an I/O command. The media module knows the configuration, such as RAID 3 or RAID 5, of the I/O subsystem. The command module need not know this information, and is generic. Even the media module does not know the particular hardware used, which is in turn dealt with by separate hardware interface modules.

The present invention also improves performance and throughput by pushing error recovery decision points to the lowest possible level. For example, a thread detects an error, it itself initiates error determination and recovery, without requiring any communication back to the net or command module level.

For a fuller understanding of the nature and advantages of the invention, reference should be made to the following description taken in conjunction with the accompanying drawings.

BRIEF DESCRIPTION OF THE DRAWINGS

FIG. 10 is a diagram of the main thread functions;

DESCRIPTION OF THE PREFERRED EMBODIMENT

Figure 1:
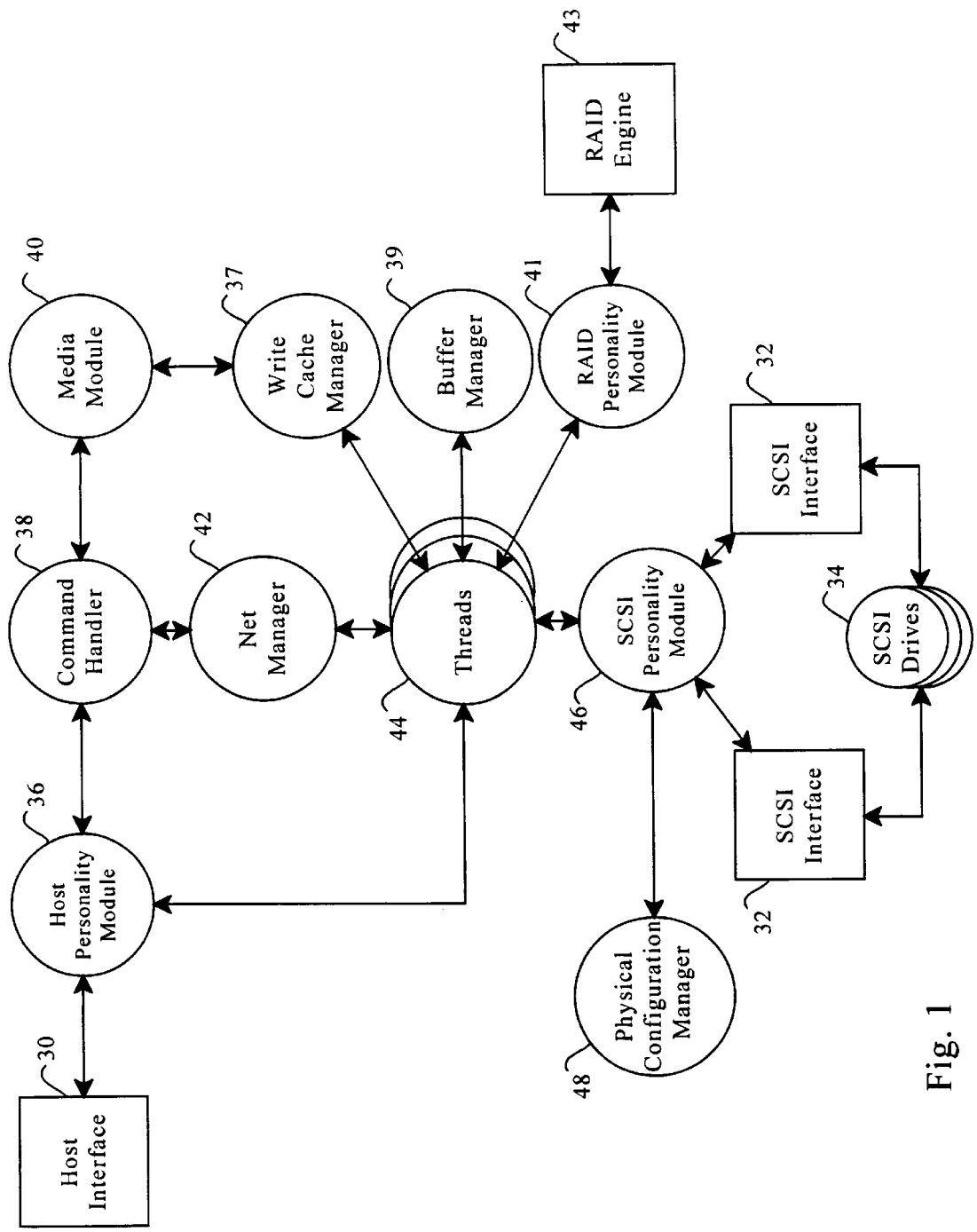
FIG. 1 is a block diagram of the software modules of the present invention.

FIG. 1 is a block diagram of one embodiment of the software modules of the present invention, shown in conjunction with hardware for a host and RAID system for ease of understanding. FIG. 1 shows a host SCSI interface 30 on one end of the software modules, and a pair of SCSI interfaces 32 on the other end. The SCSI interfaces 32 are connected to a number of disk drives 34.

I/O requests come through host interface 30 to a host personality module 36. Host personality module 36 deals with a particular type of hardware interface, here a SCSI interface, and provides a host command to a generic I/O control command module (command handler) 38. Module 38 can segment the host command as appropriate and provide a request for a generic command or commands to a media module 40. Media module 40 manages media configurations and virtual store on the disk and has enough information to build a net for performing an I/O operation to a particular media configuration. The media module need not know the hardware specifics of the disk drives, for instance, but rather their configuration as RAID 3, RAID 5, mirrored disks, etc. The media knows where the logical drives are, and from the configuration information knows which drives are the parity or redundancy drives.

Using the configuration information, media module 40 will provide a media specific command, here a RAID-type command, back to generic command module 38 in the form of a net. Module 38 allows the net manager 42 to execute, the net using a series of threads 44. The threads interface with a SCSI personality module (SPM) 46 which provides the interface to the particular physical I/O subsystem. The threads can also interface with the host through host personality module 36. The SCSI personality module 46 communicates with a PCM module 48. Physical configuration manager (PCM) module 48 stores the particular hardware information needed for the I/O subsystem, such as the type of SCSI interfaces and a physical location of a disk drive. PCM 48 can be changed upon user installation or on power-up. PCM 48 stores the functions necessary for communicating with the particular type of hardware used, and drive personality module 46 can simply call functions in PCM 48, which then gives, for instance, the channel number (SCSI interface) and SCSI ID number for the I/O operation.

The threads also interface, as needed, with a write cache manager 37, a buffer manager 39, and a RAID personality module 41, which in turn interfaces with RAID engine 43.

Figure 2:
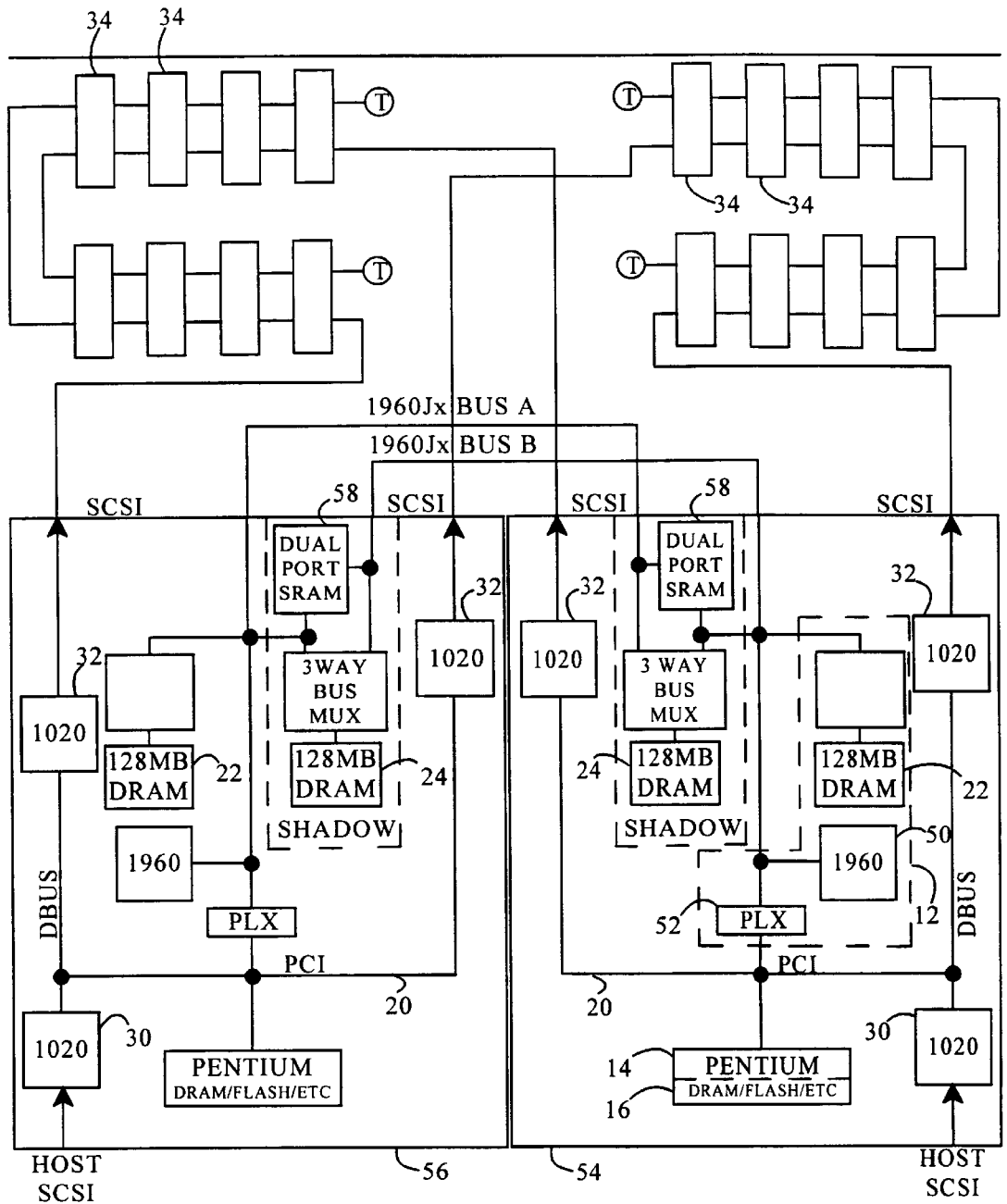
FIG. 2 is a block diagram of one embodiment of RAID controller hardware for use with the present invention.

FIG. 2 is a block diagram of a particular hardware platform which could be used in one embodiment of the present invention for a RAID system. As can be seen, data flow is provided through two different host SCSI interfaces 30 to the disk drives 34. Each host SCSI interface 30 communicates with two RAID SCSI interfaces 32 over PCI busses 20. Data is staged in-between them in a buffer memory 22. Shadow buffer memories 24 are provided for redundancy.

Different entities perform the actual I/O functions in response to OP codes from the threads. For example, RAID engine controller 50 is used for generating RAID parity (XOR) and other functions (e.g., comparing two buffers). The SPM performs the OP codes for a read thread. The threads, along with the nets, are generated in microprocessor 14 using associated memory and support hardware 16. The media module and generic command module also run out of microprocessor 14, along with the host and drive personality modules. The threads actually execute in microprocessor 14, with their particular OP codes being transmitted across PCI bus 20 through PLX interface 52 to controller 50.

Figure 3:
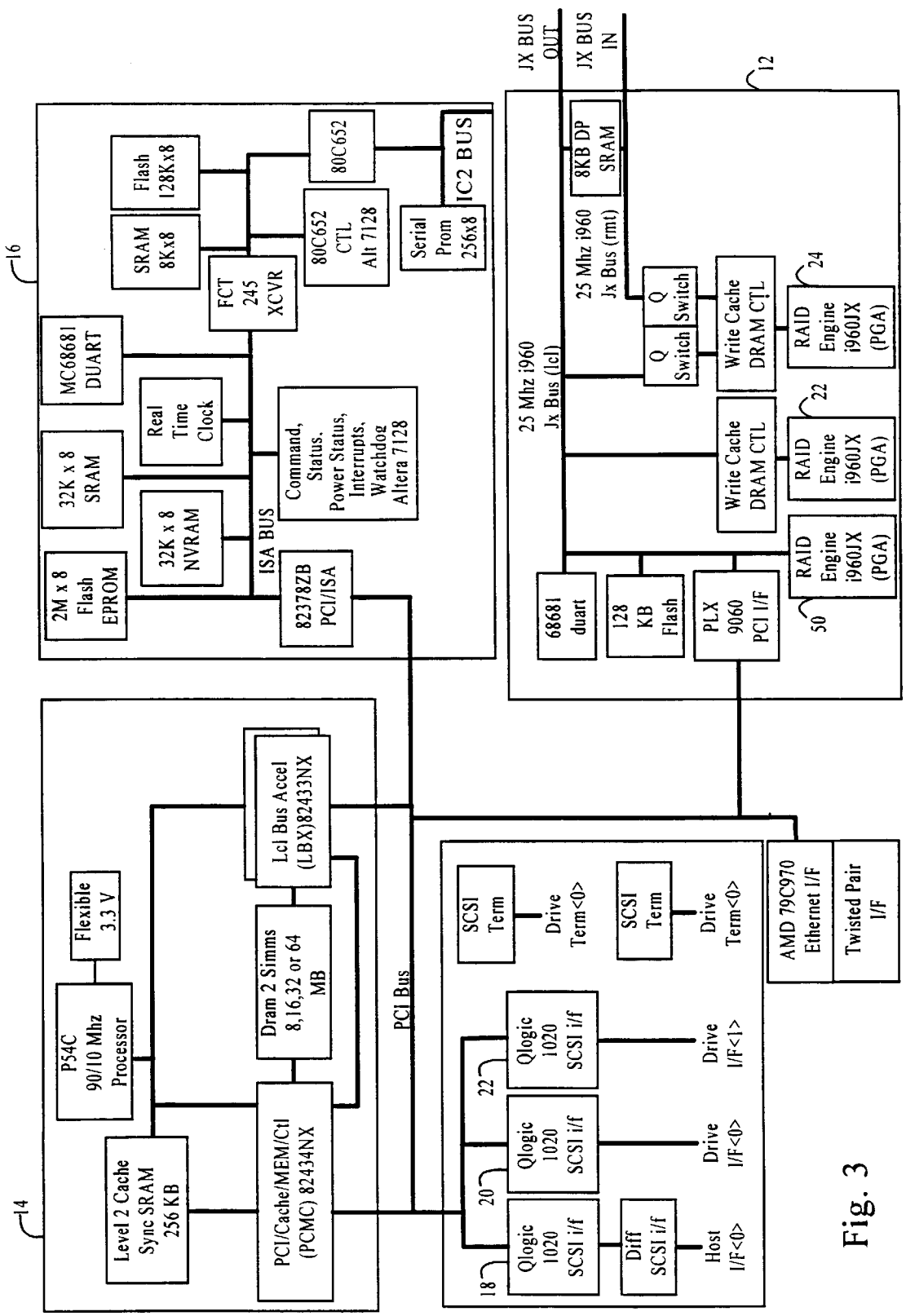
FIG. 3 is a block diagram providing more detail of certain portions of FIG. 2.

FIG. 2 shows two separate circuit boards 54 and 56 which provide redundant backup for each other and are interconnected on bus A and bus B, with communications between each other provided through dual port SRAMs 58. FIG. 3 is a more detailed block diagram illustrating the configuration of microprocessor 14 with its associated cache memory, and memory and support circuitry block 16. Also shown are more details of subsystem 12 of FIG. 2 containing the RAID controller 50 and buffer memory 22.

Data Flow

The flow of data through the system takes place primarily across the system DBUS (e.g., PCI bus 20 of FIG. 2) and its interfaces to board-level DBUSs. The interfaces to external devices in the system include a set of drive interfaces, controlled by SCSI personality modules (SPMs), and at least one host interface channel, controlled by a host personality module (HPM). Data is staged between these two devices in a buffer 22, with associated control circuitry and software, together referred to as the staging buffer.

A typical data flow would involve the following data moves for a read, a write, and a RAID-5 regen-read.

Read-Cmd Data Flow

1. Data is transferred from a drive by the SPM to staging buffers.
2. Data is transferred from the staging buffers by the HPM, for transmission to the host.

RAID-5 Write-Cmd Data Flow

1. The new write-data is transferred from the host personality module into the staging buffers at buffer-A.
2. The old-data and the old-parity are transferred from drives by SPM to staging buffers B and C, the RAID engine performs an XOR operation on the data buffers A, B, and C, to generate parity, or P in buffer D.
3. Buffer-D (which contains P) is transferred to the parity drive by SPM.
4. Buffer-A (new-data) is transferred from the staging buffers by SPM to the data drives.

RAID-5 Regen-Read-Cmd Data Flow

1. The SPM reads data from all but the failed drive to the staging buffers.
2. The RAID engine does the XOR operation to generate the data for the failed drive.
3. Data is transferred from the staging buffer by the HPM to the host.

Nets

The present invention introduces the concept of a "net." A net defines the relationship and ordering of threads necessary to accomplish a defined action. By traversing the net, the expected work is performed. Nets are created by the media module. Nets are usually associated with ("owned" by) generic commands, although certain threads can spawn a net in recovery situations. Nets are defined by net-control-blocks (NCBs), which are normally associated with generic commands, but can alternately be associated with a thread which is initiating a recovery net in error situations.

"Read" Net

Figure 4:
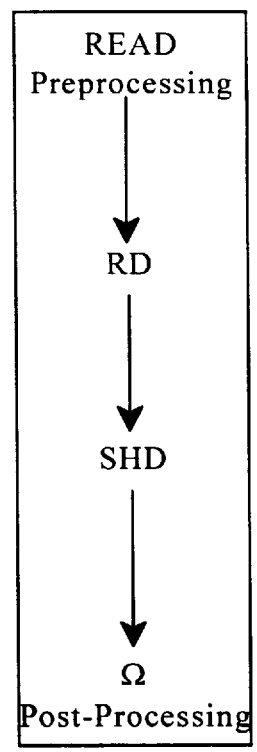
FIG. 4 illustrates a graphical presentation of a read net.

The read-net shown in FIG. 4 performs a simple disk read and transfers the data to the host personality module for subsequent transmission to the host. The "READ" symbol at the top of the net merely denotes the start-point of the diagram, and identifies the net-type. Net pre-processing would be done at this point. The arrow indicates that when the "READ" (or "preprocessing") activity is complete, the next thread to notify is RD. This refers to a read-data thread with tag #0. Execution of the "arrow" causes the read-data thread to initiate the disk read, and can be thought of as a "predecessor-complete" event.

The read-data has the responsibility of transferring the requested amount of data from the drive to the staging buffer. Additionally, the thread will attempt any retries it deems appropriate in case of error. If the thread detects an inconsistent redundancy stripe, the repair will be effected within the context of the thread.

Once the read-data thread completes, it taps the send host data (SHD) thread with the "predecessor-complete" event. The SHD thread recognizes that all the necessary predecessor-complete events have occurred, and initiates activity. SHD is responsible for transferring the requested amount of data from the staging buffer to the specified host personality module.

When the SHD thread completes, it taps the "termination" thread with the "predecessor-complete" event. The termination thread recognizes that all the necessary predecessor-complete events have occurred and initiates post-processing.

Once post-processing is complete, the net has completed and returns control and status to the "owner" of the net.

"Read-Modify-Write" Net

Figure 5:
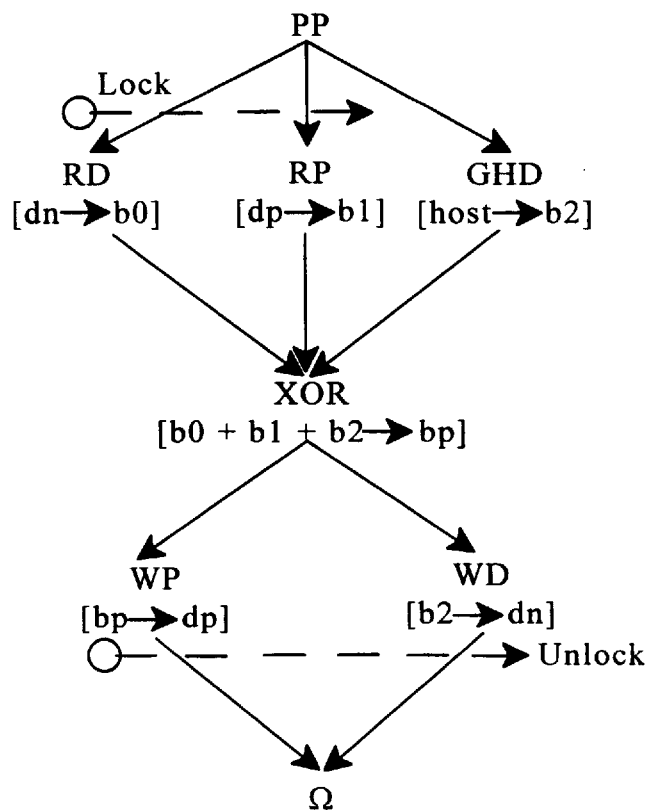
FIG. 5 illustrates a graphical presentation of a read modify write net.

This net, shown in FIG. 5, is known as a READ-MODIFY-WRITE, or RMW, net. This net coordinates the process of gathering the host's write data, gathering the array's old data and old parity, combining the three into the new parity, and then writing the new parity as well as the new write data to the requisite disks in the array.

Upon the "start net" event, the RMW pre-processing thread initialization allocates a span lock, initializes the appropriate data in the net structure and generates "predecessor complete" events to the RD, RP, and GHD, which cause all three to be scheduled on the active thread queue. The RD and RP threads perform as always, by allocating buffer space and then requesting SPM to gather the data. The GHD thread allocates buffer space, then requests HPM to gather data from the host. Each of the RD, RP, and GHD threads generate a "predecessor complete" event to the XOR thread when complete.

The XOR thread causes the RAID engine to perform the XOR operation on buffers specified by the XOR thread. Once complete, the XOR thread generates "predecessor complete" events to the WD and WP threads, which write the data and the parity, respectively. When they complete, they generate "predecessor complete" events to the post-processing thread.

When the post-processing thread has received both "predecessor complete" events, it deallocates the span-lock, then deallocates any resources not defined as having been deallocated by the net's threads already, and then notifies the net master of net completion.

"Regen-Read" Net

Figure 6:
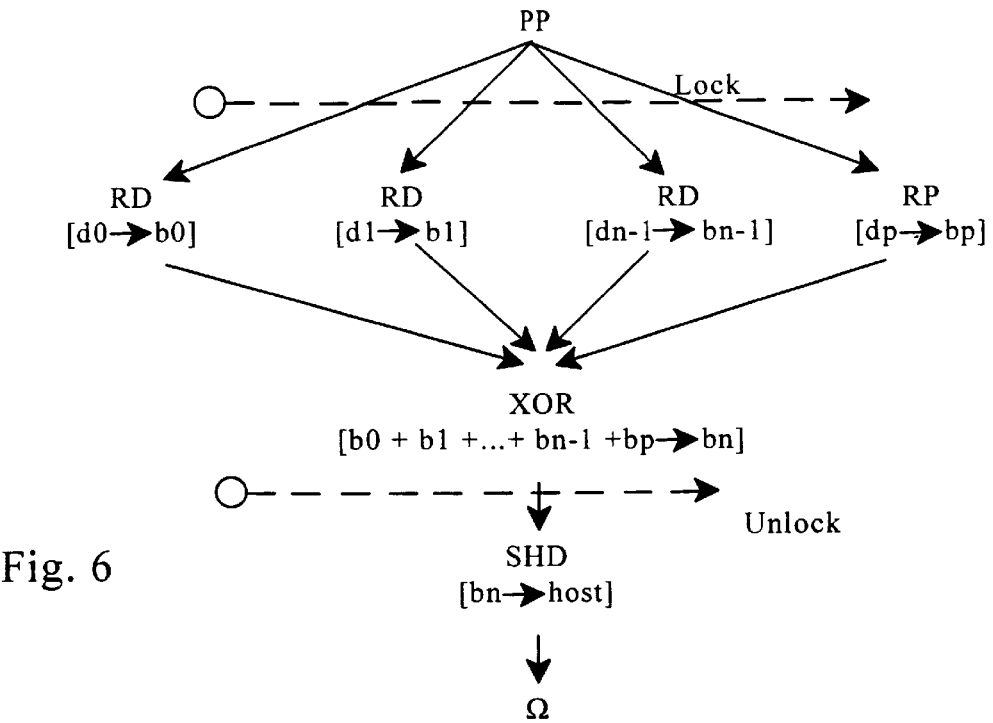
FIG. 6 is a graphical representation of a regenerate-read net.

FIG. 6 shows a regenerate-read net. When the media is configured as RAID 5, and a particular drive in the array is not present or functioning, the missing drive's data can be regenerated from the remaining drives in the array. This condition has been referred to as REGEN. Hence, the net in FIG. 6 is known as a REGEN-READ net.

When a read command maps to a drive which is still present, then that I/O can be performed via a regular read net, but if the mapped drive happens to be the one that's missing, then a REGEN-READ net must be executed in order to read all the other drives in the array so that the missing drive's data can be regenerated.

Once the pre-processing thread has completed, it allocates a span lock and generates "predecessor complete" to each of the threads following. These threads include Read-Data's for each of the remaining data drives (for example, in an 8+1 array, there would be 7 remaining data drives, therefore 7 RD threads), as well as one Read-Parity thread for reading the parity data. These "n" threads are allowed to execute asynchronously as fast as possible, and as they complete, they generate "predecessor complete" events to the XOR thread. As this thread receives these events, it generates work for the RAID engine, particularly the work of exclusive-ORing of all the previously gathered data. This XOR data represents the regenerated data from the missing drive. Once all the exclusive-ORs are complete, the data is transferred to a buffer. The SHD thread is then activated, which notifies the HPM that the data is ready. When the SHD completes, post-processing takes place prior to net completion.

It is important to note that this net is protected by a span-lock, even though it performs no write operations. This is to protect against some other net changing this portion of the array in the middle of this net's operation, resulting in bad data regeneration.

"Regen-Write" Net

Figure 7:
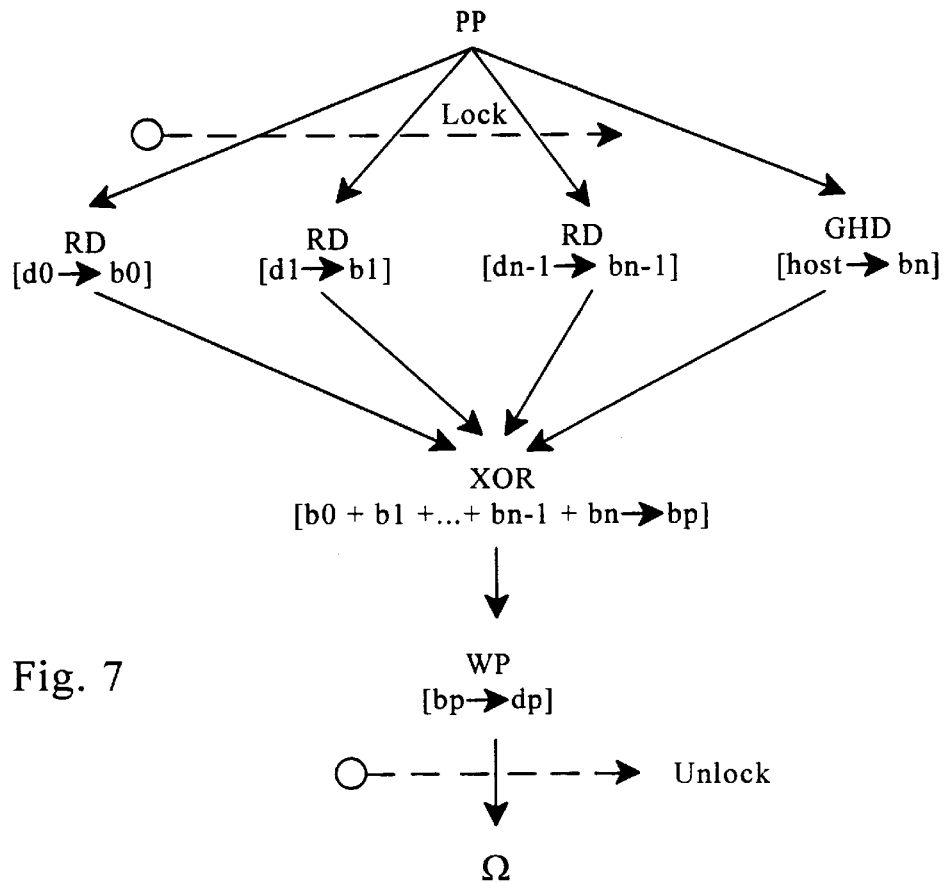
FIG. 7 is a graphical representation of a regenerate-write net.

FIG. 7 shows a regenerate-write net. When a write command is received that maps to the missing drive in an array, then a different host write net is generated. This net is known as a REGEN-WRITE net. The purpose of this net is to generate the new parity information that reflects the data stored on the remaining disk drives as well as the data which would have been stored on the missing disk drive.

In order to do this, the net reads the remaining data drives to generate their parity information (these are the RD threads in the figure). There is no need to read the old parity, because it is just going to be overwritten with the new parity generated by adding the new write data to the parity generated by reading all the other data disks.

Net Nodes

Figure 8:
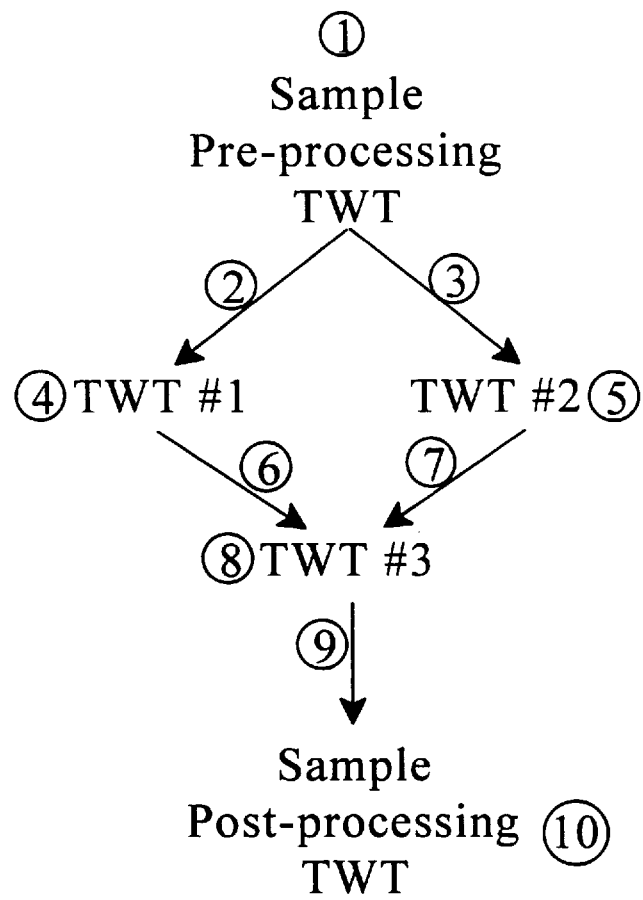
FIG. 8 is a graphical representation of inter-nodal relationship in a net.

Each net is composed of nodes, and each node is occupied by a thread. In FIG. 8, objects 1, 4, 5, 8 and 10 refer to nodes. Object 1 is the "initial node," which is occupied by the pre-processing (PP) thread responsible for initializing some of the fields in the net control block (NCB) used by the rest of the threads in the net. Object 10 is the "terminal node," which refers to the post-processing thread responsible for post-net "clean-up" and reporting good or bad status to the net master. The other objects (4, 5, 8) refer to typical threads, examples being RD, RP, WD, GHD, and so on.

A net is made up of nodes, and each node in a net is occupied by a thread. It is important to remember that a node and a thread are two different things. Not all threads execute in a net context.

Node identifiers in a net are numbered top-to-bottom, left-to-right, starting with the number 1. The number 0 is reserved for describing the predecessor to the "initial node."

Relationships Between Nodes

FIG. 8 shows lines connecting certain nodes. These lines, or arcs, describe inter-nodal relationships. An arc leading into a node (from above) is a "predecessor" relationship, whereas an arc leading out of a node (from below) is a "successor" relationship. Arc 2 is a successor with regard to node 1, but is a predecessor with regard to node 4. Inter-nodal relationships can be thought of as "open lines of communication." Any one node can be both a successor or predecessor of zero or more other nodes in the same net.

Any two nodes in a net connected by an arc can exchange information directly. This information is typically notification of an event having occurred, possibly with some parameters supplied for further clarification. For example, if node 4 has completed successfully, it notifies node 8 via node 8's "predecessor event" interface, utilizing inter-nodal relationship 6. Thread error recovery also makes use of this interface to initiate retries.

Notice that node 8 has two predecessor relationships (6, 7). The net graph rules require that node 8 does not begin operation until all of its predecessors complete. Lack of an internodal relationship implies no direct communication between those two nodes is allowed. The graphical relationships of nets and threads according to this invention make the software easier to write, trouble-shoot and upgrade.

Glossary of Net and Thread Symbols

Throughout this application the reader will find net graphs. The following symbols are notations used in these graphs.

TABLE 1

Glossary of Net and Thread Symbols

| ABBREVIATION | NAME | FUNCTION |
| --- | --- | --- |
| PP | Pre-Processing | Performs net pre-processing for a given type of net. |
| Ω | Post-Processing | Performs net post-processing for a given type of net. This primarily involves notifying the "net master" the net has completed. |
| host | Host DMA | Represents data flow on the host interconnect. |
| d | Data | Represents data. |
| dn, dm | Device ID | Physical device "n" or "m". |
| dp | Parity Device | Represents the parity physical device. |
| b1 . . . bn | Buffer | Represents buffers used to store data. |
| bp | Parity Buffer | Represents buffer for storing parity. |
| + | Exclusive OR | Represents the exclusive OR operation. |
| ? | Compare | Represents the compare operation. |
| → | Data Flow | Direction of data flow. |

TABLE 1-continued

Glossary of Net and Thread Symbols

| ABBREVIATION | NAME | FUNCTION |
|---|---|---|
| o→ LOCK | Lock | Represents acquisition of span or recovery lock. |
| o→ UNLCCK | Unlock | Represents release of a span or recovery lock. |
| RD | Read Data | Generates a read command for a particular disk drive, placing the data in a [previously] specified buffer. |
| RP | Read Parity | Read parity data from a parity drive |
| WD | Write Data | Requests data to be transferred to the disk. |
| WP | Write Parity | Write parity data to a drive. |
| XOR | Parity XOR Operation | Takes the provided buffers and requests that the RAID engine perform an XOR operation. When the RAID engine completes, the Thread is complete. |
| FB | Fill Buffer | Fills a buffer with the specified data pattern. |
| COMP | Compare | Compares the contents of the specified buffers for an exact byte-by-byte match or optionally for a specific data pattern. |
| GHD | Gather Host Data | Request the HPM to transfer data from the host to the specified buffer(s). |
| SHD | Send Host Data | Request the HPM to transfer data from the specified buffer(s) to the host. |
| $DC_{Cmd}$ | Device Control | Sends a device control command to the physical device such as a spin-up or test unit ready. |

Net Types

Each individual type of net is defined in the sections below. This implies that the net facility keeps the rules for building instances for each type of net, should that net be requested as a result of a particular operation or recovery being performed on a particular instance of the media.

Nets fall into three main categories:
1. I/O Nets.
2. Error Recovery Nets.
3. Diagnostic Nets.

I/O nets involve the movement of data between the host computer system, or the controller itself, and the storage device. Error recovery nets are internal to the controller and help maintain data integrity on an I/O device. Diagnostic nets perform the same functions as I/O nets or recovery nets with error recovery suppressed. The following sections describe these basic net types.

I/O Nets

These net-types are built in order to perform I/O requests between a requester and the I/O engine. These are typically reads, writes, and compares, and can be issued on any legal media type.

There are exactly two kinds of I/O nets:
1. Host I/O nets; and
2. Controller I/O nets.

Host I/O nets have a data transfer component to them which handles moving data between the controller and host computer system. These components are the "Gather Host Data" and "Send Host Data" threads. Controller I/O nets have neither one of these transfer components.

Examples of host I/O nets are:
1. Host READ net;
2. Host WRITE net;
3. Host COMPARE net;
4. Host BUFFER READ net; and
5. Host BUFFER WRITE net.

Examples of controller nets are:
1. Controller READ net;
2. Controller WRITE net;
3. Controller COMPARE net;
4. FORMAT net;
5. REBUILD net; and
6. DEVICE CONTROL net.

Net State Processing

Figure 9:
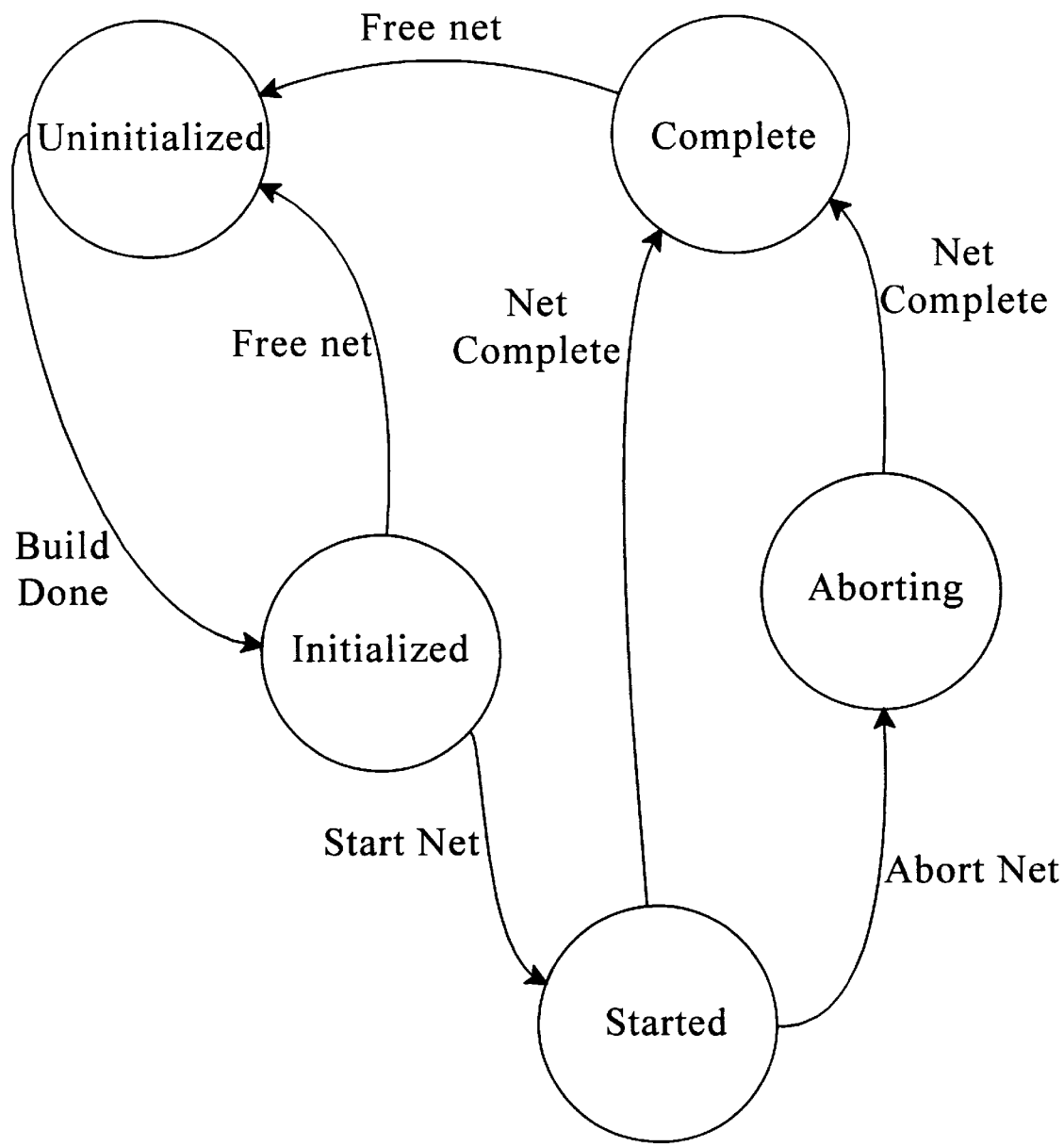
FIG. 9 is net state diagram.

A net has states with respect to its readiness to execute, abort, or be deallocated. These states are represented in FIG. 9.

A deallocated net is un-initialized. An allocated net built by media is initialized. From the initialized state the net can be freed or the net can be started, making its state unitialized or started. In the started state, the net can be aborted, making its state "aborted" or the net can complete, making its state "complete." A complete net deallocated becomes unitialized, the net states are primarily controlled by the net master and net post-processing. While a net could be implemented as a thread there is no compelling reason to do so.

Threads

Threads are generally illustrated in FIG. 10. Each thread contains a pointer to the predecessor(s) or successor(s) thread(s). There is also a buffer allocation indication. The I/O OP codes and I/O parameters of the thread are included. In addition, the thread contains a pointer to an error recovery table. A span lock for locking up exclusive use of a span of data may also be specified, as discussed in more detail below. Other elements of the thread structure are apparent from FIG. 10.

A thread has two conditional relationships with a net:
1. A thread occupies a node in a net; and
2. A thread is a net master in error recovery situations.

Not all threads participate in these relationships. Those that don't participate in (1) are known as "standalone" threads. All threads can participate in relationship (2).

Every net in a the system is made up of nodes, and each node is occupied by a thread which comprises the necessary device-level operations to perform a single requested data transfer service.

Threads that participate in a net node relationship access their buffers indirectly, through the net buffer table, perform span locking and unlocking, serve as net masters to error recovery nets, and interface to I/O drivers and the HPM.

However, not all threads participate in a net node relationship. Threads that execute standalone, without the aid of a net, access their buffers directly, never perform span locking, perform limited error recovery, and interface primarily with a subsystem which interfaces with SPM directly. The write cache is one example of such a subsystem. For example, to purge data from a drive, the write cache can allocate a thread directly to SPM without generating a net.

All threads perform I/O operations on no more than one device. Should an I/O request require several devices to satisfy, the request is broken up into several threads, one for each device access.

A thread's I/O request need not be contiguous. It can be scattered or gathered across buffer memory. However, drive address space must be contiguous.

Threads can reference zero or more logical buffers in order to perform data transfer. Each logical buffer can be referenced by one or more threads. Each logical buffer is made up of one or more physical buffers, which point to the block data.

Threads use zero or more span locks to synchronize storage access between nets. Span lock usage varies based on thread type. Not all threads acquire span locks. Note that a thread takes out a span lock on behalf of a net, rather than the net taking out the span lock. This reduces the average period of time a span is locked.

For example, in a RAID-3/5 configuration, a "write" net will execute all the steps necessary for writing the data to disk: Lock the span, read old data, read old parity, gather new data, calculate new parity, write new parity, write new data, and unlock the span. Each of the preceding operations is implemented as a thread, and must be performed in a certain order. This is guaranteed by the structure of the net. The complexity of the operation is hidden from the I/O command. Where the net structure allows it, each thread is free to execute in parallel. In the case where more than one net exists in the system, all active threads from those nets are operating in parallel in an effort to obtain maximum performance.

Each thread occupying the above sample-net is implemented as a special kind of thread. The special features have to do with linking the threads in a net so that (1) thread execution order is preserved, (2) buffer usage is shared and minimized, and (3) span lock duration is minimized.

Perhaps the most important concept to understand regarding threads is that nearly all error recovery involving data service is performed by threads. In order to recover from errors, each thread uses an error recovery table which is composed of one or more error recovery actions. Appendix II sets forth a thread data structure for a thread control block.

Thread State Processing

All threads execute, in part or in whole, state machines, such as shown in FIGS. 11A–11D. Not all threads participate in all states or action routines.

Figure 11A:
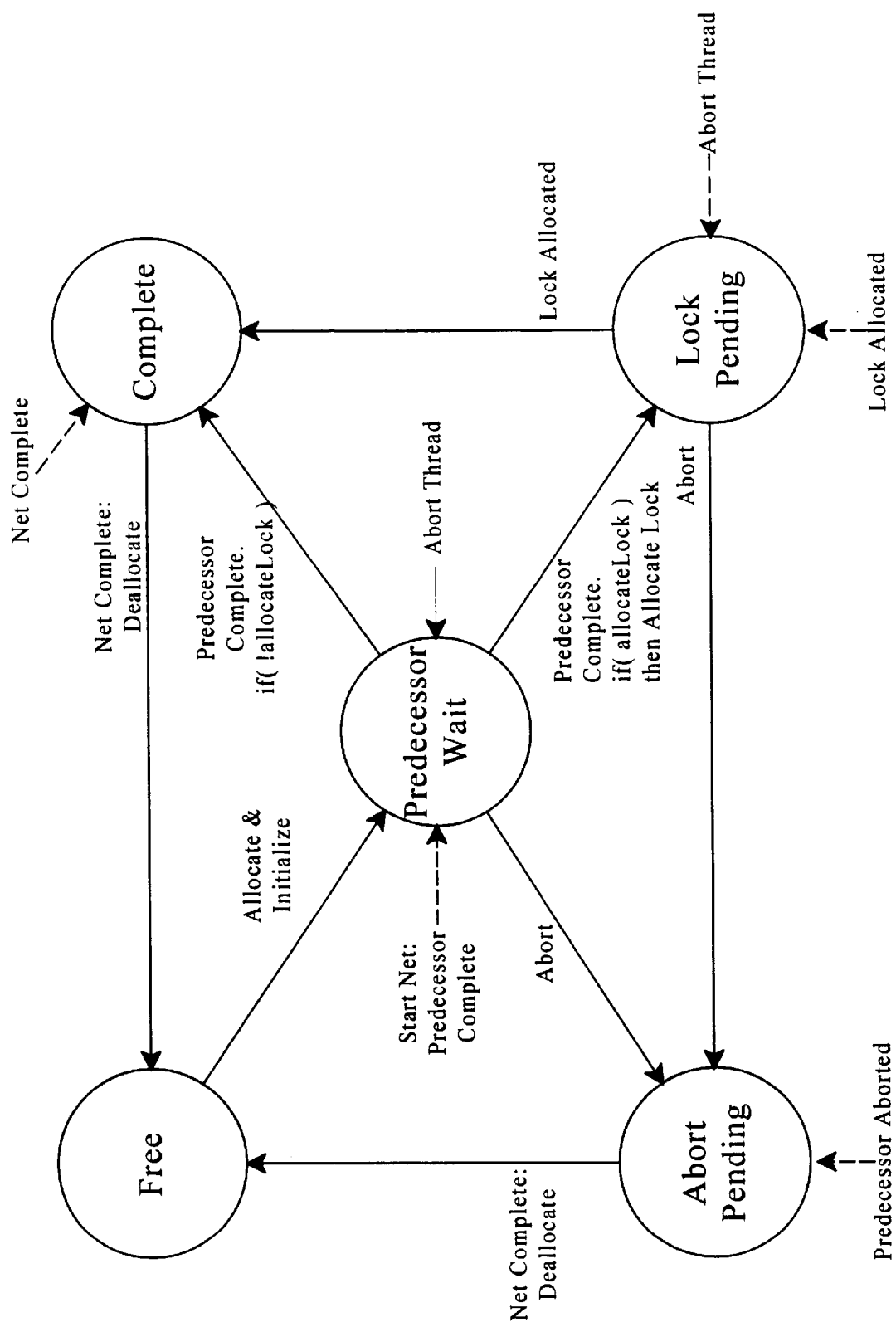
FIGS. 11A–11D are state diagrams for illustrative threads.
Figure 11B:
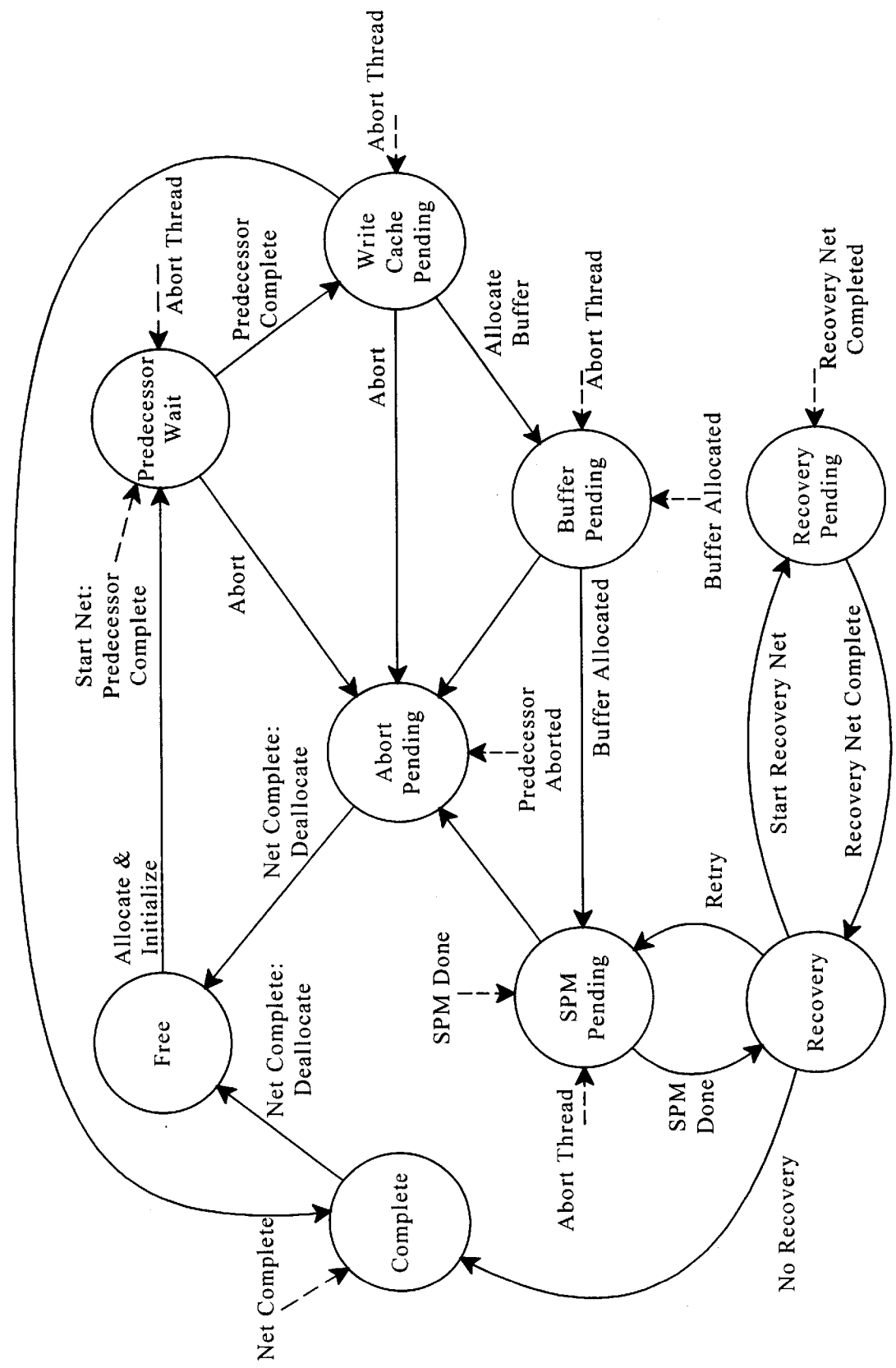
Figure 11C:
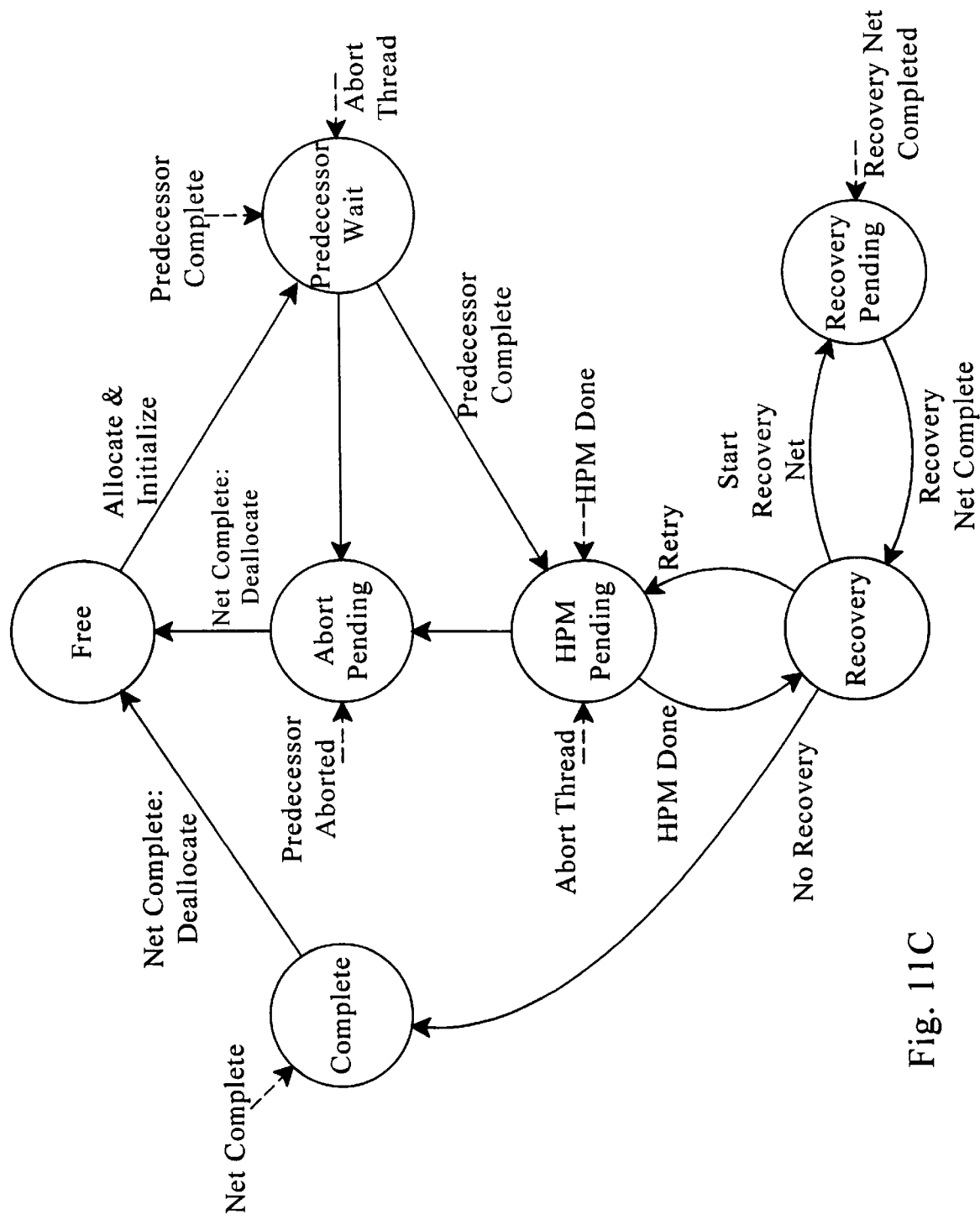
Figure 11D:
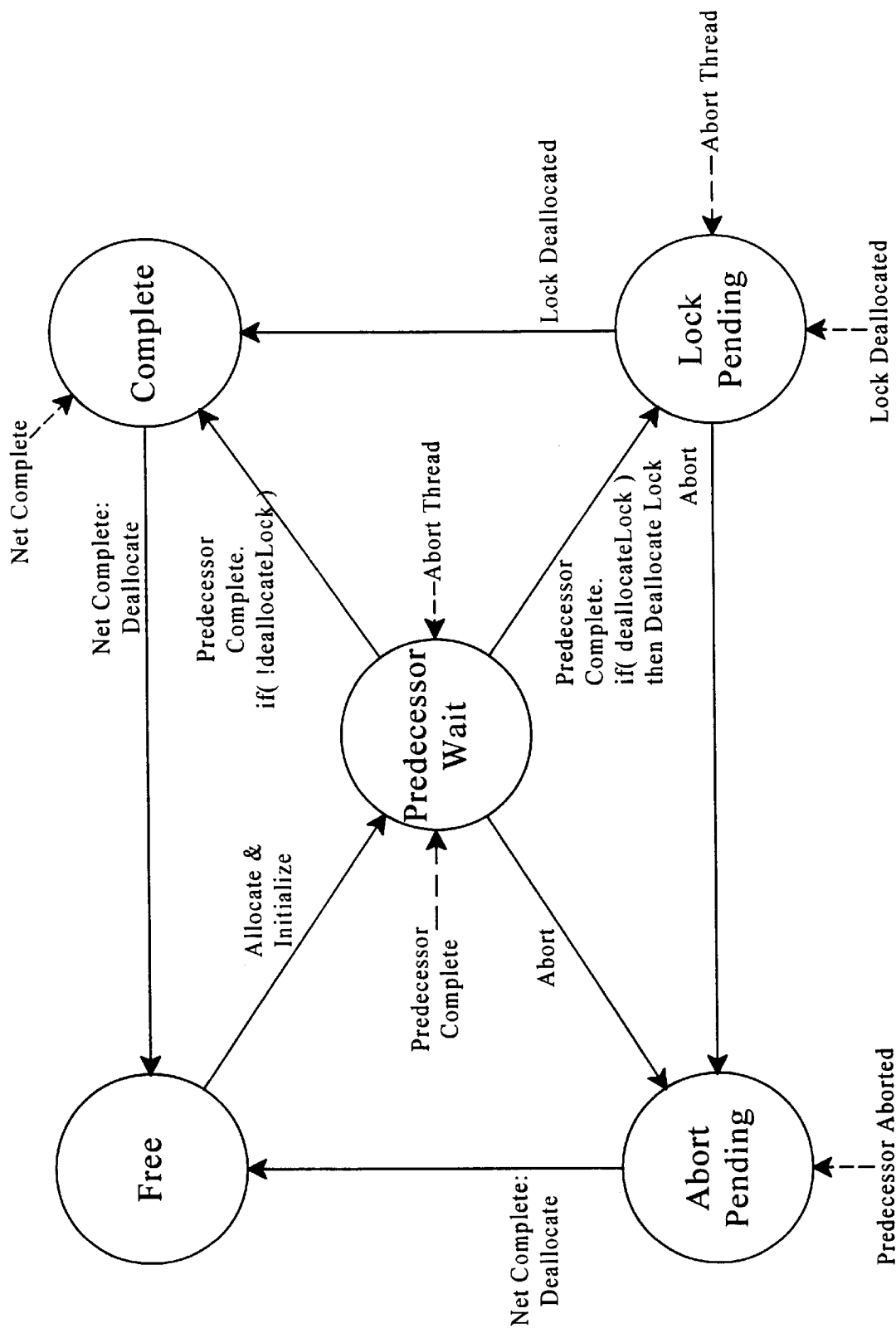

FIG. 11A is a pre-processing thread state machine, FIG. 11B is a read thread state machine, FIG. 11C is a send host data thread state machine, and FIG. 11D is a post-processing thread state machine.

Spans

The present invention provides the operation on data by particular I/O operations on a designated span for the disk drives. As will be discussed below, multiple threads can operate on a particular disk drive in different spans of the disk drive.

Figure 12:
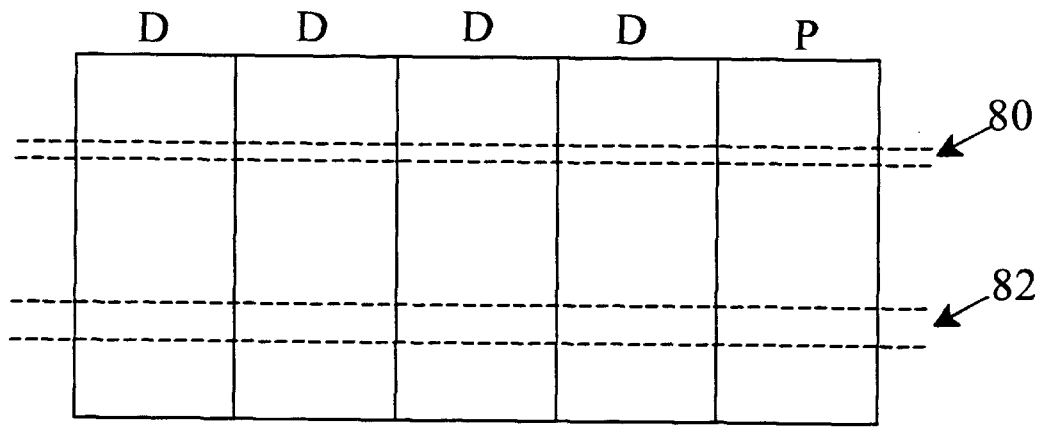
FIG. 12 is a diagram illustrating different spans of a RAID system.

FIG. 12 illustrates five disk drives, with four data disk drives D and a parity or redundancy drive P. Two different spans are indicated by areas 80 and 82. As can be seen, these operate on different portions of the data in the individual disk drives. Although the disk head can only be at one place at a time, there is otherwise no need to block other operations during the preparation, post-processing or accessing of different disk drives at the same time.

Span Locks and Recovery Locks

Since thread execution is asynchronous, it is necessary to provide a mechanism for ensuring that no more than one write operation is in progress at any particular time on any particular portion of a redundancy stripe. The mechanism chosen for this function is called a "span lock" and is described in some detail in the following section. Span-locks are utilized at different points in the processing of nets, depending on the net-type and media configuration.

In addition to the span-lock, it is also necessary to ensure that on any particular location within a span there is one and only one thread attempting to repair or recover a bad stripe. This can occur when multiple threads within the same net (therefore within the same span-lock) each encounter an error on the media and want to repair it. If they're repairing the same "sub-stripe (particular portion of a span)," then only one of the threads should effect the repair.

Span Locks

A span is defined to be a contiguous range of blocks all residing within the same redundancy stripe. A span-lock is a mechanism whereby a single net can block any other nets from altering that span while the lock is out. For example, when a read-modify-write net is ready to start, it must take out a span-lock on its extent before starting the read operations. This is illustrated in FIG. 5. This is to protect against some other net modifying the span asynchronously between the reads and writes of this read-modify-write net. The span-lock would be released after successful writing of both the new data and new parity. The span-lock is allocated by the pre-processing thread and deallocated by the post-processing thread.

Alternate Span-Lock

In an alternate embodiment, the lock can be taken out after the pre-processing thread completes. This is because the pre-processing operation requires no drives, and therefore no locks. In this manner, the lock is not taken until the first of the read-threads requires it. This reduces the average period of time that a span is locked.

Any net using a parity drive should lock the span on which it is operating. This is to ensure that no other net alters the parity or data information during this particular net's operation.

In this alternate embodiment, for the read-modify-write example of FIG. 5, there are two possible threads which can execute the span-lock allocation; the read-data, and the read-parity. Similarly, either the write-data or the write-parity thread will deallocate the span-lock. In the case of allocation, the first read-thread should effect allocation. However, deallocation should be effected by the last write-thread. The question is, how does each thread know whether it is the thread which should allocate or deallocate the span-lock?

That is where span-lock owners come in. Each net has a unique identifier, a net-id. When a span-lock is requested by a thread, it uses the net-id to request it. If the span (or portion thereof) is currently locked by another net, the current thread is rejected. If, however, the span is locked with the same net-id, it is assumed that another thread in the same net has already allocated the span-lock on behalf of the net, and the allocate request returns with the success status.

The span-lock deallocation is slightly more complex. It is necessary that the lock-manager know how many times the lock will be deallocated, so that it can be determined when the last thread completes, so that the span-lock can truly be deallocated. This will likely be accomplished by embedding within the net-id the number of threads which will be deallocating the span-lock. The span-lock manager uses this value to determine when to actually deallocate the span-lock.

Recovery Locks

When a thread encounters errors, it attempts several levels of recovery. The recovery level and the error condition dictate whether the span, or a smaller portion of the span (sub-span), has been corrupted (parity doesn't match data). When this condition is detected during recovery, the recovery's first priority is to repair the sub-span's data-integrity. Before beginning the sub-span repair, the recovery process must allocate a recovery-lock for the sub-span. Unlike the span-lock, a recovery-lock can only be allocated by a single thread, and cannot be shared, therefore, there is no concept of net-id and shared owners for recovery-locks. Once the repair thread has allocated the recovery-lock for the sub-span being repaired, the rest of the recovery-net can proceed with the repair process. When the repair is complete, the recovery-lock is deallocated and the original net's processing continues.

Error-recovery within nets is discussed in further detail later in this document.

Figure 13:
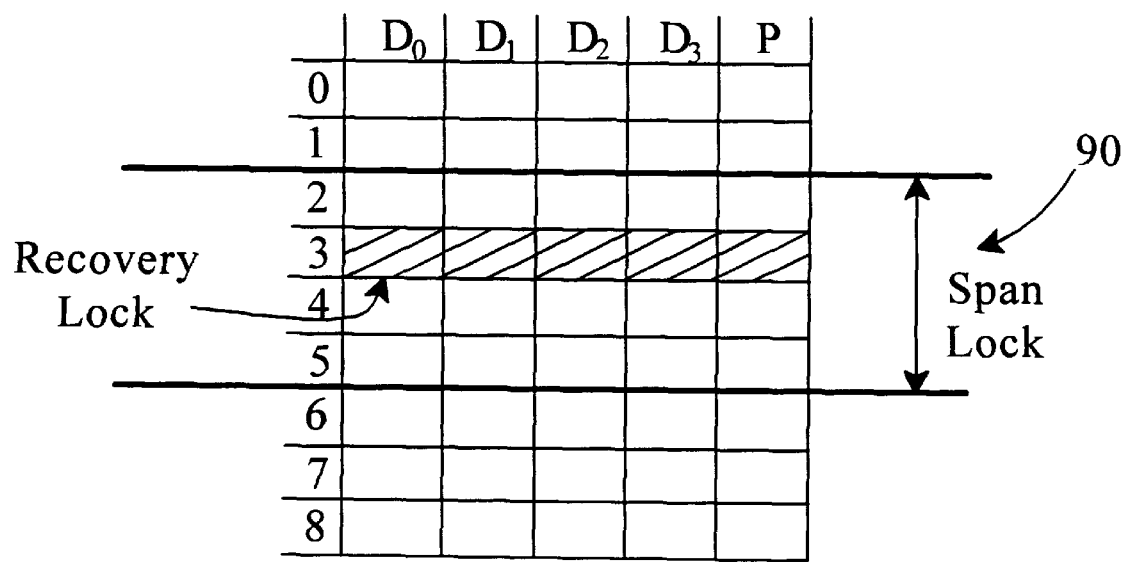
FIG. 13 is a diagram of a RAID system illustrating a portion of a span locked during a recovery operation.

FIG. 13 illustrates a span lock 90 across five disk drives. As can be seen, the span lock includes blocks 2–5 of each disk drive. For a recovery lock, it is possible, for instance, that only block 3 has erroneous data that needs to be corrected. Accordingly, a recovery lock can be issued which only affect block 3 of span 90.

"Recovery" Nets

There are certain nets which exist only in circumstances where a media repair is necessary. These "recovery nets" can be called by a thread; the current net does not need to complete first. A recovery net itself can have a thread which may detect an error and call another recovery net, spawning nested recovery nets.

"Bad Block Repair" Net

Figure 14:
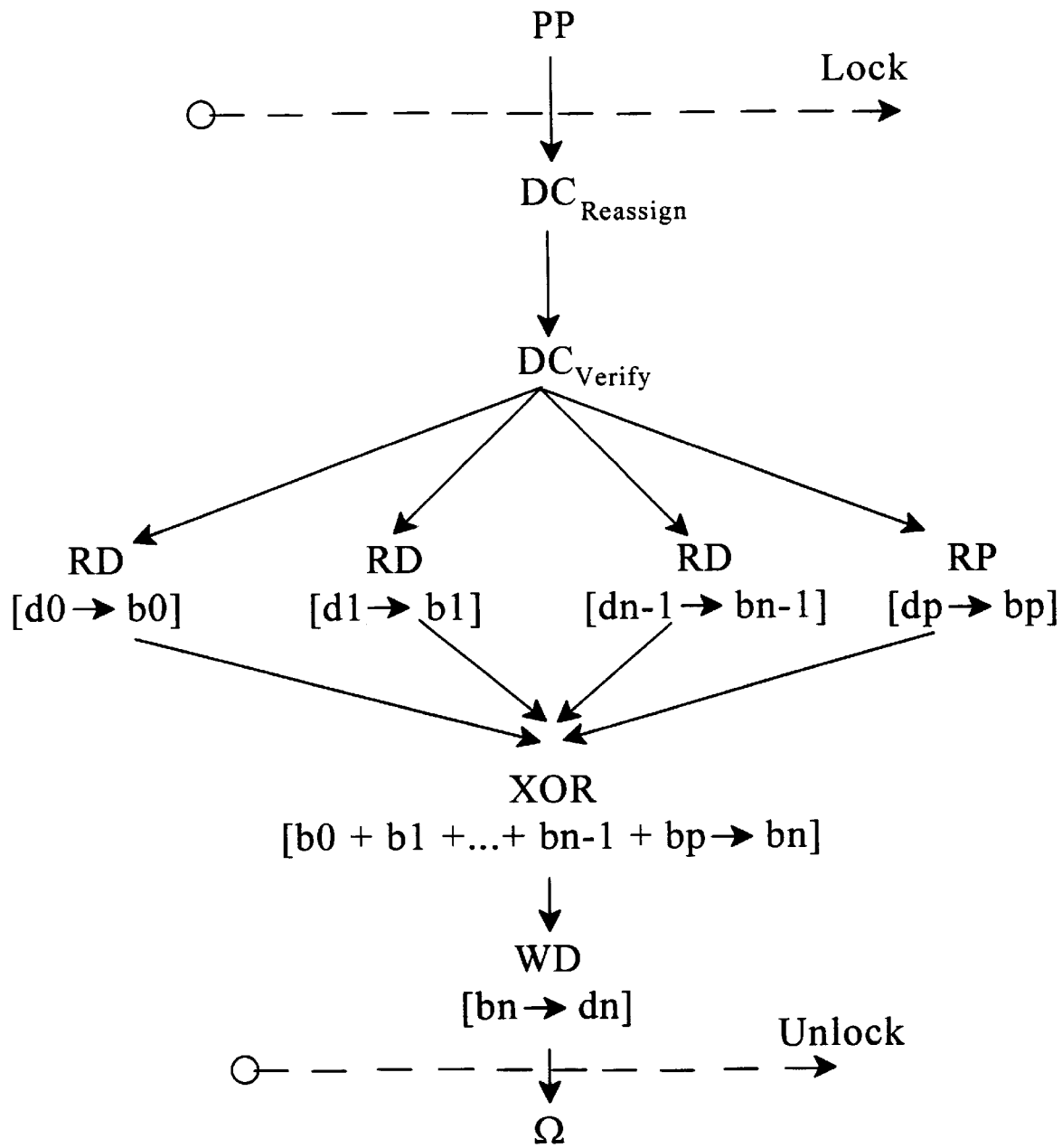
FIG. 14 is a graph of a net illustrating a bad block repair with a portion subject to a recovery lock.

Bad block repair (BBR), as shown in FIG. 14, takes place when a block on a disk has suffered an unrecoverable error, and therefore must be reassigned to a different location on that disk. Normally, the data that had been stored on that block would be lost, but in all RAID systems except RAID-0, we can regenerate the data from the other drives, then write that data to the new, reassigned block on the disk. This is known as a bad-block-repair operation.

This is a recovery net, therefore a recovery lock must be allocated prior to any data manipulation. The recovery lock is allocated by the pre-processing node. Control is then passed to the reassign bad block thread, which issues a command to the drive telling it to reassign the bad block to some other (expected) good block on the disk. When the thread receives the good response, control is passed to the verify thread, which issues a command to the drive to ensure that the reassigned block has no errors. These two threads may alternately be optimized into a single thread.

Once the bad block has been reassigned, the missing data is regenerated form the other drives in the array, and then written to the reassigned blocks. When the data reconstruction is complete, control is passed to the post-processing node, where the recovery lock is released and the net completes.

As will be understood by those of skill in the art, the present invention may be embodied in other specific forms without departing from the spirit or essential characteristics thereof. Accordingly, the foregoing description is intended to be illustrative, but not limiting, of the scope of the invention which is set forth in the following claims.

What is claimed is:

1. An I/O controller comprising:
    a host interface;
    a data bus coupled to said host interface;
    a data memory coupled to said data bus;
    a drive interface, coupled to said data bus, for interfacing to an I/O system;
    a processor coupled to said data memory;
    a program memory coupled to said processor; and
    a program stored in said program memory, including instructions for
        a plurality of threads, each thread performing a specified subset of an I/O operation, and
        creating a plurality of nets, each net being a group of said threads, for each I/O command received from said host interface.

2. The I/O controller of claim 1 wherein said I/O system is a RAID system.

3. The I/O controller of claim 1 wherein said program further comprises:
    a host interface for converting a host I/O request into a generic I/O command;
    a media module for, responsive to said generic I/O command, assembling a net specific to a configuration of an I/O system coupled to said drive interface; and
    a drive personality module for converting thread instructions from said net into instructions specific to a hardware configuration of said I/O system.

4. The I/O controller of claim 1 wherein at least one of said threads includes an error recovery table, said error recovery table setting forth at least one error type.

5. The I/O controller of claim 4 wherein said media module further comprises an error recovery net corresponding to said error type.

6. The I/O controller of claim 1 further comprising a span lock manager for allocating spans of data in said I/O subsystem to nets.

7. The I/O controller of claim 6 wherein at least one of said threads includes a span lock request code.

8. The I/O controller of claim 7 wherein said span lock request code includes a net ID.

9. The I/O controller of claim 6 wherein at least one of said threads includes a span lock deallocate code.

10. The I/O controller of claim 9 wherein said span lock manager is configured to deallocate said span when a predetermined number of span lock deallocate codes are received by said span lock manager, said predetermined number corresponding to a number of threads using said span.

11. The I/O controller of claim 1 further comprising a recovery lock manager configured to allocate a recovery lock of a sub-span to a requesting thread.

12. The I/O controller of claim 1 wherein at least one thread becomes active upon completion of at least one designated predecessor event.

13. The I/O controller of claim 1 wherein at least one of said nets includes at least one thread for allocating buffer space.

14. The I/O controller of claim 13 wherein at least one thread is configured to request any needed span lock.

15. The I/O controller of claim 1 wherein at least one of said nets includes at least one thread for deallocating buffer space.

16. The I/O controller of claim 15 wherein said at least one thread is configured to release any span lock.

17. An I/O controller comprising:
    a processor;
    a program memory coupled to said processor; and
    a program stored in said program memory, including
        a host interface for converting a host I/O request into a generic I/O command;
    a drive interface;
    a media module configured to, responsive to said generic I/O command, assemble a net specific to a configuration of an I/O system coupled to said drive interface; and
    a drive personality module configured to convert thread instructions from said net into instructions specific to a hardware configuration of said I/O system.

18. The I/O controller of claim 17 wherein said I/O system is a RAID system.

19. The I/O controller of claim 17 wherein at least one of said threads includes an error recovery table, said error recovery table setting forth at least one error type.

20. The I/O controller of claim 19 wherein said media module further comprises an error recovery net corresponding to said error type.

21. The I/O controller of claim 17 further comprising a span lock manager for allocating spans of data in said I/O subsystem to nets.

22. The I/O controller of claim 17 further comprising:
a host personality module configured to convert thread instructions from said net into instructions specific to a hardware configuration of said host interface.

23. A method for operating an I/O controller comprising the steps of:
creating a plurality of threads, each thread performing a specified subset of an I/O operation; and
creating a plurality of nets, each net being a group of said threads, each I/O command receiving from said host interface having at least one net;
wherein said I/O controller is a RAID controller and said I/O operation is a RAID operation.

24. A method for operating an I/O controller comprising the steps of:
creating a plurality of threads, each thread performing a specified subset of an I/O operation;
creating a plurality of nets, each net being a group of said threads, each I/O command received from said host interface having at least one net;
converting a host I/O request into a generic I/O command;
assembling a net specific to a configuration of an I/O system coupled to a drive interface; and
converting thread instructions from said net into instructions specific to a hardware configuration of an I/O system.

25. A method for operating an I/O controller comprising the steps of:
creating a plurality of threads, each thread performing a specified subset of an I/O operation; and
creating a plurality of nets, each net being a group of said threads, each I/O command received from said host interface having at least one net;
wherein at least one of said threads includes an error recovery table, said error recovery table setting forth at least one error type.

26. The method of claim 25 further comprising the step of generating an error recovery net corresponding to said error type.

27. A method for operating an I/O controller comprising the steps of:
creating a plurality of threads, each thread performing a specified subset of an I/O operation;
creating a plurality of nets, each net being a group of said threads, each I/O command received from said host interface having at least one net; and
allocating spans of data in an I/O subsystem to nets.

28. The method of claim 27 wherein at least one of said threads includes a span lock request code.

29. The method of claim 28 wherein said span lock request code includes a net ID.

30. The method of claim 27 wherein at least one of said threads includes a span lock deallocate code.

31. The method of claim 30 further comprising the steps of deallocating said span when a predetermined number of span lock deallocate codes are received, said predetermined number corresponding to a number of threads using said span.

32. A method for operating an I/O controller comprising the steps of:
creating a plurality of threads, each thread performing a specified subset of an I/O operation;
creating a plurality of nets, each net being a group of said threads, each I/O command received from said host interface having at least one net; and
allocating a recovery lock of a sub-span to a requesting thread.

33. A method for operating an I/O controller comprising the steps of:
creating a plurality of threads, each thread performing a specified subset of an I/O operation; and
creating a plurality of nets, each net being a group of said threads, each I/O command received from said host interface having at least one net;
wherein at least one thread becomes active upon completion of at least one designated predecessor event.

34. A method for operating an I/O controller comprising the steps of:
creating a plurality of threads, each thread performing a specified subset of an I/O operation; and
creating a plurality of nets, each net being a group of said threads, each I/O command received from each host interface having at least one net;
wherein at least one of said nets includes at least one thread for allocating buffer space.

35. The method of claim 34 further comprising the step of requesting any needed span lock with said at least one thread.

36. A method for operating an I/O controller comprising the steps of:
creating a plurality of threads, each thread performing a specified subset of an I/O operation; and
creating a plurality of nets, each net being a group of said threads, each I/O command received from said host interface having at least one net;
wherein at least one of said nets includes at least one thread for deallocating buffer space.

37. The method of claim 36 further comprising the step of releasing any span lock with said at least one thread.

* * * * *